H. G. PAPE.
SOCKET.
APPLICATION FILED MAY 25, 1918.
Reissued Nov. 5, 1918.
14,546.
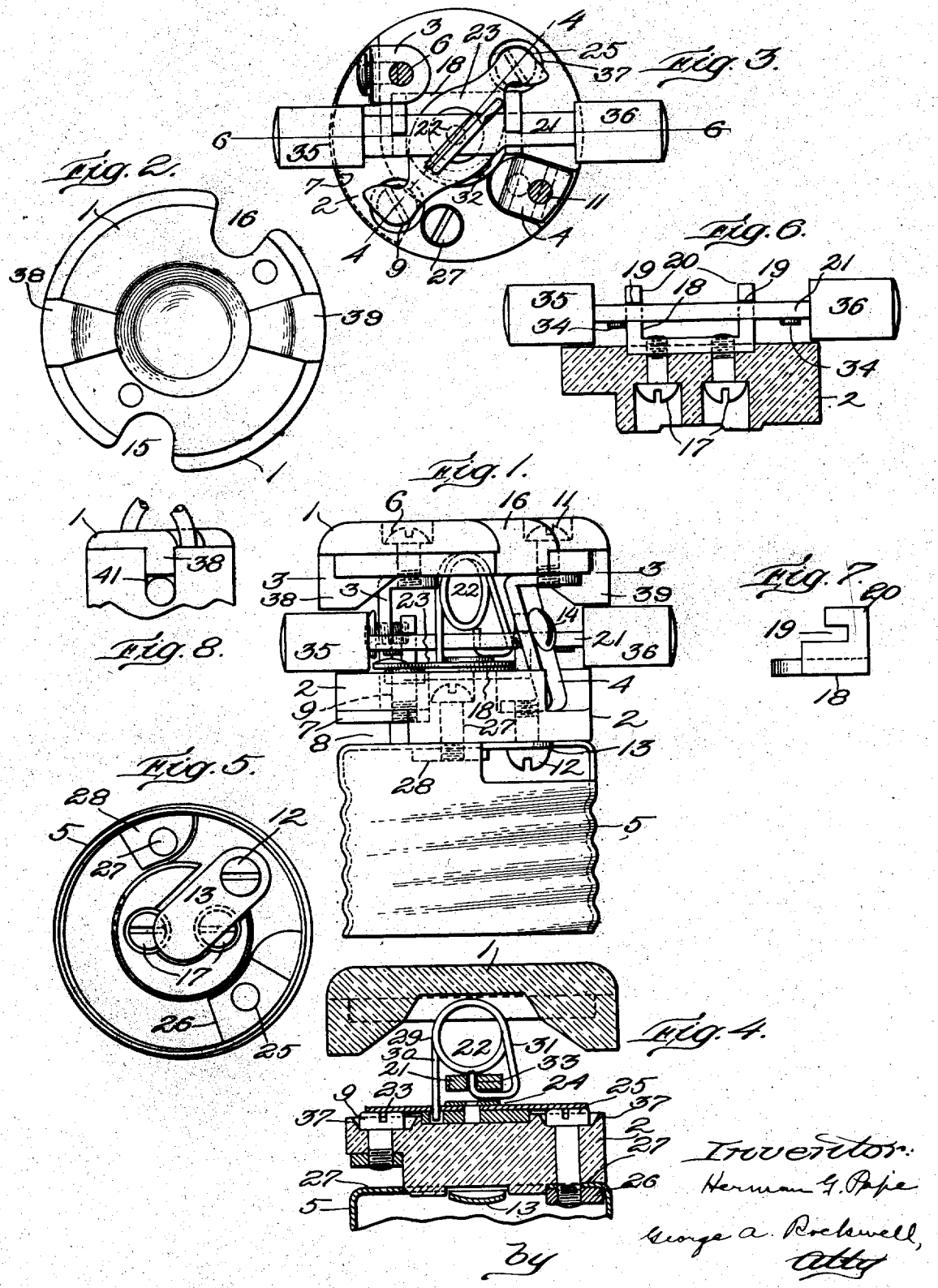
Inventor:
Herman G. Pape
George A. Rockwell,
Atty
By

UNITED STATES PATENT OFFICE.

HERMAN G. PAPE, OF NEW YORK, N. Y., ASSIGNOR TO RALPH A. BELMONT, OF NEW YORK, N. Y.

SOCKET.

14,546. Specification of Reissued Letters Patent. Reissued Nov. 5, 1918.

Original No. 1,223,417, dated April 24, 1917, Serial No. 105,514, filed June 23, 1916. Application for reissue filed May 25, 1918. Serial No. 236,655.

*To all whom it may concern:*

Be it known that I, HERMAN G. PAPE, of New York city, in the county and State of New York, have invented a new and useful Socket, of which the following is a specification.

One feature of my invention consists in arranging the switch mechanism in the circuit so that when the switch is open the screw shell is electrically isolated thus eliminating liability of injuring a person while handling the device when the latter is wet.

Another feature is a bracket having open slots to guide the slide and to permit ease of assembling and disassembling, the slide being preferably held against sidewise movement by the same spring which connects the slide and the movable contact.

Another feature consists in having the bracket provide a supporting surface for the movable contact member so that the latter will be maintained in proper operative position and held against twisting or canting.

Another feature of my invention consists in providing a lubricant well or pocket adjacent to one or more of the fixed contacts of the switch mechanism.

Other features of my invention will be pointed out below.

In the accompanying drawings:

Figure 1 is a side elevation of a socket constructed in accordance with my invention, the other casing or shell being omitted;

Fig. 2 is a plan view of the inner side of the outer section of the porcelain body hereinafter described;

Fig. 3 is a sectional view on line 3—3 of Fig. 1;

Fig. 4 is a section on line 4—4 of Fig. 3;

Fig. 5 is an elevation of the end of the socket opposite to that shown in Fig. 3;

Fig. 6 is a partial section on line 6—6 of Fig. 3;

Fig. 7 is a detail hereinafter described; and

Fig. 8 is an elevation of the upper end of a lamp socket embodying the mechanism shown in Fig. 1.

The lamp socket herein shown comprises a body made up of two sections 1 and 2 of porcelain or other suitable insulating material which are connected by a pair of metallic struts 3 and 4. On this body 1—2 is mounted a circuit controlling switch which is the same in its general principle of construction and mode of operation as the switch shown and described in my co-pending application, Serial No. 87,102, filed March 27, 1916, and also a metallic screw shell 5. The usual metallic housing for the body 1—2 and parts carried thereby together with its lining of insulating material is not shown in Figs. 1 to 7 of the drawings but is constructed and applied in the ordinary fashion.

The strut 3 is fastened at one end to the body section 1 by means of screws 6 while the opposite end of said strut is made with a laterally extending arm 7 occupying a notch 8 formed in body section 2 and fastened to the latter by means of a screw 9. This strut 3 is tapped to receive a screw 10 by means of which the end of one of the lead wires of the circuit is fastened thereto.

The strut 4 is fastened at one end to the body section 1 by means of a screw 11 and at its opposite end to the body section 2 by means of a screw 12, said screw 12 also serving to fasten in position on said body section the usual center contact 13. This strut 4 is also tapped to receive a screw 14 by means of which the end of the other lead wire of the circuit is fastened to said strut.

The body section 1 is formed upon its periphery with two notches 15 and 16 through which the lead wires extend to the screws 10 and 14.

Between the two body sections 1 and 2 and fastened to the latter by means of a pair of screws 17 is a bracket 18 comprising two posts 20 formed with upon slots 19 within which is slidably mounted the actuating member 21 of the switch mechanism. Actuating member 21 is connected by a spring 22 with the movable contact 23 pivotally connected near its middle with the bracket 18 by a stud 24. This contact member 23 coöperates with the head of screw 9 and also with the head of a screw 25 extending through body section 2 and having threaded engagement with a nut or block 26 which clamps the flange 27 of screw shell 5 to said body section. The screw 25 is arranged upon the opposite side of the pivot stud 24 from screw 9 and the movable contact member 23 when swung on stud 24 moves into and out of engagement with the two screws 9 and 25 simultaneously. As additional means for securing the screw shell 5 to the body section 2 I provide another screw 27 extending through said body section and having threaded engagement with a nut or block 28 which also clamps the flange 27 of shell 5 to said body section.

When the movable contact member 23 is in engagement with the two screws 9 and 25 the circuit is closed and is traced as follows:—From strut 3 with which one of the lead wires is connected by screw 10, through arm 7, screw 9, member 23, screw 25, to screw shell 5; thence through the lamp mounted in said shell back to the center contact 13 from which it continues through screw 12 to strut 4 with which the other lead wire is connected by means of screw 14. It will thus be seen that each screw 9 and 25 serves as a fastener, one holding the strut 3 to body section 1 and the other holding the screw shell 5 to said body section, also as a stationary contact, and as a conductor.

As shown in Fig. 4 the spring 22 comprises a coil 29 from which project two legs 30 and 31. The leg 30 extends through a hole in the movable contact 23 and beyond the inner side of the latter into a slot 32 formed in the base of bracket 18 concentric with stud 24, while the leg 31 extends around and under actuating slide 21 with the extremity thereof occupying a hole 33 formed in said slide.

The stress of spring 22 serves to yieldingly hold the actuating slide 21 at the limit of its movement in one direction or the other with one of a pair of stop lugs 34 provided on said slide in engagement with bracket 18, and to yieldingly hold movable contact 23 at the limit of its movement in one direction or the other, the swinging movements of said member in both directions being limited by its engagement with the posts 20 of bracket 18. The spring 22 also serves the important function of holding slide 21 within the slots against sidewise displacement.

The ends of the actuating slide 21 are provided with buttons 35 and 36 of insulating material which may be differently colored so that their position will serve to indicate "open" and "closed" condition of the switch mechanism.

A feature of my invention of practical importance consists in providing a lubricant well 37 adjacent the head of each screw 9 and 25, each well being herein shown as an annular groove surrounding the head of its screw and filled with a lubricant such as grease. When the circuit is closed the current warms the screws 9 and 25 thus softening the grease while the quick snappy movements of the contact 23 in approaching and leaving the heads of screws 9 and 25 tend to suck the softened grease up onto the tops of said heads thus maintaining the wearing and contacting surfaces of the screws and member 23 well lubricated but without likelihood of making the contact surfaces sticky.

By having the slide 21 arranged between the two legs 30 and 31 of the spring 22 and carrying the leg 31 around and under said slide, not only is the mechanism made more compact than heretofore, but the leg 30 may be made to engage the member 23 nearer the pivot of the latter which improves the action of the spring and of the member 23.

It is customary to form slots 40 to receive the push buttons 35 and 36 in the metallic housing 41 within which the parts described are arranged in order that the body 1—2 with its screw shell may be slid into said housing, and another feature of my invention consists in providing the body section 1 with a pair of diametrically opposite lugs 38 and 39 which occupy said slots 40 to close the outer ends of the latter and hold the body 1—2 against rotative displacement within the housing 41 thus relieving the push buttons of this duty.

The described mode of lubricating the switch mechanism has the advantage that the contacts are not overdosed with lubricant and the latter can not become dry and coat the contacts and thereby act as insulation as heretofore. In time vaseline and other lubricating material become sticky and dry and gummy, the result being that the electric contact becomes poor and sometimes spoiled entirely and by sinking a groove adjacent to the contact and putting lubricant in the groove, the lubricant will when the switch is operated draw up or suck up the lubricating material in moderate quantities as desired and thereby keep the contact surfaces continually lubricated.

What I claim is:

1. A socket comprising a screw shell; a movable contact; and a fixed contact cooperating with the movable contact, said fixed contact being directly connected to the shell.

2. A socket comprising a body of insulating material; a screw shell mounted on said body; a movable contact; and a fixed contact coöperating with the movable contact, said fixed contact being directly connected to the shell.

3. A socket comprising a body consisting of two separated sections of insulating material; two struts connecting said sections; means for connecting one of the lead wires to one of said struts and the other lead wire to the other of said struts; switch mechanism mounted between said sections, and comprising a stationary contact which also serves to fasten one of said struts to one of said sections.

4. A socket comprising a body consisting of two separated sections of insulating material; two struts connecting said sections; means for connecting one of the lead wires to one of said struts and the other lead wire to the other of said struts; switch mechanism mounted between said sections, and comprising a pair of stationary contacts, one of said contacts serving to fasten one of the struts to one of said sections and a screw shell fastened to one of said sections by the other of said stationary contacts.

5. A socket comprising a body consisting of two separated sections of insulating material; two struts connecting said sections; switch mechanism mounted between said sections and comprising a stationary contact; and a screw shell fastened to one of said sections by said contact.

6. A socket comprising a body consisting of two separated sections of insulating material; conducting means holding said sections together; and means fastening said holding means to said sections including a stationary contact, and a movable contact coöperating with said stationary contact.

7. A socket comprising switch mechanism having in combination an actuating slide; a bracket to guide the slide longitudinally and formed to prevent transverse movement of the slide in one direction but open to permit transverse removal in the opposite direction; a movable contact member; and a spring actuated by said slide and actuating said member, said spring preventing transverse movement of the slide in said opposite direction when the switch is assembled.

8. A socket comprising switch mechanism having in combination an actuating slide; a bracket formed with a pair of open slots extending transversely of said slide and guiding said slide in its longitudinal movement; a movable contact member; and a spring actuated by said slide and actuating said member, said spring preventing transverse movement of said slide in the direction of the open ends of said slots.

9. In a socket the combination of a body of insulating material; switch mechanism mounted thereon comprising a movable contact having a flat portion, an actuating slide for said contact and a bracket secured to said body on which said contact and slide are mounted, said bracket being provided with a flat portion which engages the flat portion of the movable contact during movement of the latter and supports said contact against tilting.

10. In a socket the combination of a body of insulating material; switch mechanism mounted thereon comprising a movable contact having a flat portion, an actuating slide for said contact, and a bracket secured to said body on which said contact and slide are mounted, said bracket being provided with a flat portion which engages the flat portion of the movable contact during movement of the latter and supports said contact against tilting and provided with guiding portions for said slide.

11. An electric switch comprising an actuating member; a support for said member having internal means to guide said member; a movable contact member pivotally mounted on said support on an axis at substantially a right angle to said support; and means connecting said members whereby the latter member is operated by the former.

12. An electric switch comprising a switch base; a bracket having a base parallel to said switch base and having two posts; an actuating member guided by said posts and moving forward and back parallel to said switch base; a movable contact swinging in a plane parallel to said switch base; a fixed contact surface parallel to said switch base; and means operatively connecting said actuating and contact members.

13. An electric switch comprising a movable actuating member; means for guiding said member which means prevents movement of said member in one direction but permits movement in the opposite direction; a movable contact member; and means actuated by the actuating member to actuate said contact member and to prevent movement of the actuating member in said opposite direction.

14. An electric switch comprising a longitudinally movable actuating member; means for guiding said member longitudinally, which means prevents transverse movement of said member in one direction but permits transverse movement in the opposite direction; a movable contact member; and a spring actuated by said actuating member and actuating said contact member, said spring preventing transverse movement of the actuating member in said opposite direction.

15. An electric switch comprising an actuating slide; a bracket to guide the slide longitudinally and formed to prevent transverse movement of the slide in one direction but formed to permit transverse movement in the opposite direction; a movable contact member; and a spring actuated by said slide and actuating said member, said spring preventing transverse movement of the slide in said opposite direction.

16. An electric switch comprising a longitudinally movable actuating member; means for guiding said member longitudinally, which means prevents transverse movement of said member in one direction but permits transverse movement in the opposite direction; a movable contact member; a spring actuated by said actuating member and actuating said contact member, said spring preventing transverse movement of the actuating member in said opposite direction; a fixed contact coöperating with said movable contact; and a terminal plate held in position by said fixed contact.

17. An electric switch comprising a longitudinally movable actuating member; means for guiding said member longitudinally, which means prevents transverse movement of said member in one direction but permits transverse movement in the opposite direction, a movable contact member, whose movement is limited by said guiding means; and a spring actuated by said actuating member and actuating said contact member, said spring preventing transverse movement of the actuating member in said opposite direction.

18. An electric switch comprising a longitudinally movable actuating member; means for guiding said member longitudinally, which means prevents transverse movement in one direction but permits transverse movement in the opposite direction; a movable contact member; and means actuated by the actuating member to actuate said contact member and to prevent transverse movement of the actuating member in said opposite direction.

19. An electric switch comprising a longitudinally movable actuating member; means for guiding said member longitudinally, which means prevents transverse movement of said member in one direction but permits transverse movement in the opposite direction; a movable contact member; and a bow spring having a hooked connection with one of said members and an operative connection with the other of said members, said spring being twisted on its axis by the actuating member and when twisted actuating the contact member and preventing transverse movement of the actuating member in said opposite direction.

20. An electric switch comprising a longitudinally movable actuating member; means for guiding said member longitudinally which means prevents transverse movement of said member in one direction but permits transverse movement in the opposite direction; a movable contact member, whose movement is limited by said guiding means, and a bow spring having a hooked connection with one of said members and an operative connection with the other of said members, said spring being twisted on its axis by the actuating member and when twisted actuating the contact member and preventing transverse movement of the actuating member in said opposite direction.

21. An electric switch comprising a longitudinally movable actuating member; a member having an open slot extending transversely of, and guiding, said actuating member; a movable contact member; and a spring actuated by the actuating member and actuating said contact member, said spring preventing transverse movement of said actuating member away from the inner end of said slot.

22. An electric switch comprising an actuating slide; a bracket formed with a pair of open slots extending transversely of said slide and guiding said slide in its longitudinal movement; a movable contact member; and a spring actuated by said slide and actuating said member; said spring preventing transverse movement of said slide in the direction of the open ends of said slots.

23. An electric switch comprising an actuating member; a support having two posts, each having an opening to receive and guide the actuating member; a movable contact member pivotally mounted on said support on an axis substantially at a right angle thereto; and means connecting said members whereby the latter member is operated by the former.

24. An electric switch comprising an actuating member; a support having two posts, each having an opening to receive and guide the actuating member; a movable contact member pivotally mounted on said support; and a spring actuated by the actuating member when the latter moves through said openings, said spring actuating said movable contact member.

25. An electric switch comprising an actuating slide; two posts, each having an open slot to guide the slide longitudinally, said slots extending transversely of said slide; a movable contact member; and a spring actuated by said slide and actuating said member, said spring preventing transverse movement of said slide away from the inner ends of said slots.

26. An electric switch comprising an actuating slide; two posts, each having an open slot to guide the slide longitudinally, said slots extending transversely of said slide; a movable contact member, whose movement is limited by said posts; and a spring actuated by said slide and actuating said member, said spring preventing transverse movement of said slide away from the inner ends of said slots.

27. An electric switch comprising a body; and switch mechanism mounted thereon and comprising a movable contact having a flat portion, an actuating slide for said contact, and a bracket secured to said body on which said contact and slide are mounted, said bracket being provided with a flat portion which engages the flat portion of the movable contact during movement of the latter and supports said contact against tilting.

28. An electric switch comprising an actuating member; a movable contact member; means operatively connecting said members; and a support upon which said contact member is pivotally mounted, said support being provided with an extension which engages said contact member at a distance from said pivot to prevent tilting of said contact member.

29. An electric switch comprising an actuating member; a movable contact member having oppositely disposed contact arms; means operatively connecting said members; and a support upon which said contact member is pivotally mounted, said support being formed to engage said arms at a distance from said pivot to prevent tilting of said contact member.

30. An electric switch comprising an actuating member; a bracket having two posts to guide said member; a contact member centrally pivoted on said bracket, and having two arms, and means operatively connecting said members, said bracket being formed at a distance from said pivot to provide a bearing for said arms.

31. An electric switch comprising a body; an actuating member; a support having two posts, each having an opening to guide the actuating member and having a base portion between said posts, and said support being attached to said body by said base; a movable contact member pivotally mounted on said support; and a spring actuated by the actuating member when the latter moves through said openings, said spring actuating said movable contact member.

32. An electric switch comprising an actuating member; a movable contact member; means operatively connecting said members; and a support having a single pivotal connection with said contact member, said support being provided with an extension which engages said contact member at a distance from said pivot to prevent tilting of said contact member.

33. An electric switch comprising an actuating member; a movable contact member; means operatively connecting said members; and a support having a base and means to guide said actuating member, said contact member being pivotally mounted on said base on an axis at substantially a right angle thereto, and said support being provided with an extension which engages said contact member at a distance from said pivot to prevent tilting of said contact member.

34. An electric switch comprising an actuating member; a movable contact member; a spring directly operatively connected with said contact member and operatively connected with said actuating member; and a support upon which said contact member is pivotally mounted, said support being provided with a portion which engages said contact member at a distance from said pivot to prevent tilting of said contact member.

35. An electric switch comprising an actuating member; a bracket having a post to guide the actuating member; and a movable contact member pivotally mounted on said bracket and having its movement limited by said post; and means connecting said members.

36. An electric switch comprising an actuating member; a bracket having two integral posts to guide the actuating member; and a movable contact member pivotally mounted on said bracket between said posts and having its movements limited by said posts; and means connecting said members.

37. An electric switch comprising an actuating member; a movable contact member; a spring operatively connecting said members; and a support upon which said contact member is pivotally mounted, said support being provided with an extension which engages said contact member at a distance from said pivot to prevent tilting of said contact member, and said extension having a slot to permit movement of the end of said spring.

HERMAN G. PAPE.